United States Patent [19]

Almond

[11] 4,043,536
[45] Aug. 23, 1977

[54] DOOR DOLLY AND JACK

[76] Inventor: Lloyd T. Almond, 16005 N. 32nd St., Sp. 1316, Phoenix, Ariz. 85032

[21] Appl. No.: 659,272

[22] Filed: Feb. 19, 1976

[51] Int. Cl.² ............................................. B66F 3/00
[52] U.S. Cl. ................................. 254/2 R; 254/131
[58] Field of Search ............... 254/2 R, 131; 214/1 D

[56] References Cited

U.S. PATENT DOCUMENTS

| 2,473,873 | 6/1949 | Fosbender | 254/2 R |
| 2,576,016 | 11/1951 | Janusz | 254/2 R |
| 2,989,286 | 6/1961 | Gillespie | 254/131 |
| 3,235,227 | 2/1966 | Toffolon | 254/131 |
| 3,467,405 | 9/1969 | Fogg | 254/131 |
| 3,871,054 | 3/1975 | Schaefer | 254/131 |

Primary Examiner—Al Lawrence Smith
Assistant Examiner—Robert C. Watson
Attorney, Agent, or Firm—Cahill, Sutton & Thomas

[57] ABSTRACT

A rollable jack for positioning a door in lateral and vertical alignment for hanging on hinges while leaving the hands free to perform the hanging operation, the jack including an elongated handle, a bracket attached to the handle for supporting the door, and a stirrup terminating cable for inserting the foot to pivot the jack thereby raising the door to the level of the door hinges for positioning the mounting pins in the hinges.

4 Claims, 5 Drawing Figures

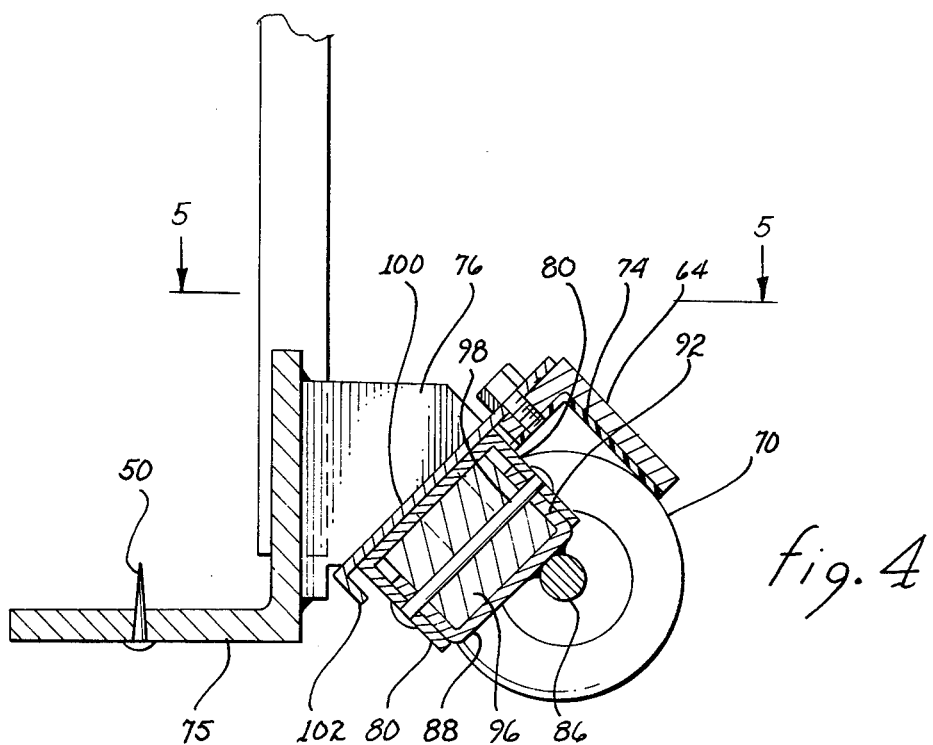
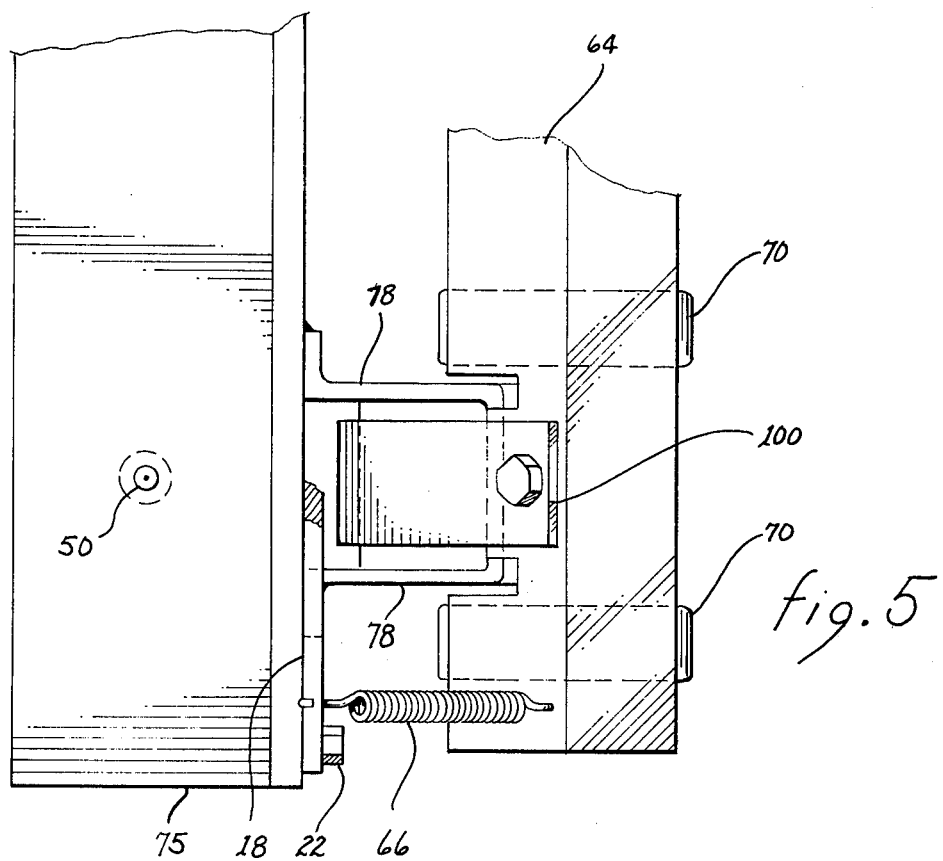

DOOR DOLLY AND JACK

This invention relates to a door jack and more particularly to a device which allows the door to be transported into lateral alignment with the door mounting hinges and to be elevated into vertical alignment with such hinges while permitting the hands to be free to perform the necessary tasks for mounting of the door.

In mounting a door on hinges, it is necessary to position the door both laterally and vertically with respect to the door mounting brackets. Once in position, it is necessary to insert the mounting pins or the like through the hinges to complete the mounting operation. It is difficult for one person to accomplish these separate tasks simultaneously since the hands are occupied in the vertical and lateral positioning of the door and are thus not free to insert the mounting pins in the hinge. Devices are described in the prior art for assisting in this or similar operations, e.g., U.S. Pat. Nos. 1,081,962; 1,833,005; and 249,288. However, as will be appreciated hereinafter, such devices do not accomplish the multiplicity of operations required to transport and position a door nor do such devices enable the hanging of a door in the efficacious manner by which the device of this invention enables the task to be performed.

Thus, it is an object of the present invention to provide a device for transporting a door or similar object to the door opening, and for positioning the door laterally and vertically for hanging while allowing both hands to be free to secure the door in the hinges.

It is also an object of the present invention to provide such a device which will maintain the door in a stationary position with respect to the floor during the hanging operation.

These and other objects are accomplished in the present invention by a device for elevating and supporting an object comprising an elongated, upright handle member; support means fixedly mounted to said handle member providing underlying support for the object to be lifted; floor engageable pivot means; and cable means having a foot insertable stirrup section, said cable means having a length such that upon insertion of the foot in said stirrup section and pressing of the foot on the floor, said pivot means are pivoted whereby said object supported by said support means is moved to an elevated position.

In a preferred embodiment of the invention, the aforesaid pivot means are provided by one or more rollers or wheels which allow the device to be easily moved across a floor to transport the door. A release lock is also provided to lock the wheels in place once lateral alignment of the door has been accomplished in order to prevent further movement of the device along the floor during completion of the hanging operation.

The following figures are provided to illustrate the invention:

FIG. 4 is a sectional view taken along line 4—4 of FIG. 1; and

FIG. 5 is a sectional view taken along line 5—5 of FIG. 1.

Figure 1:
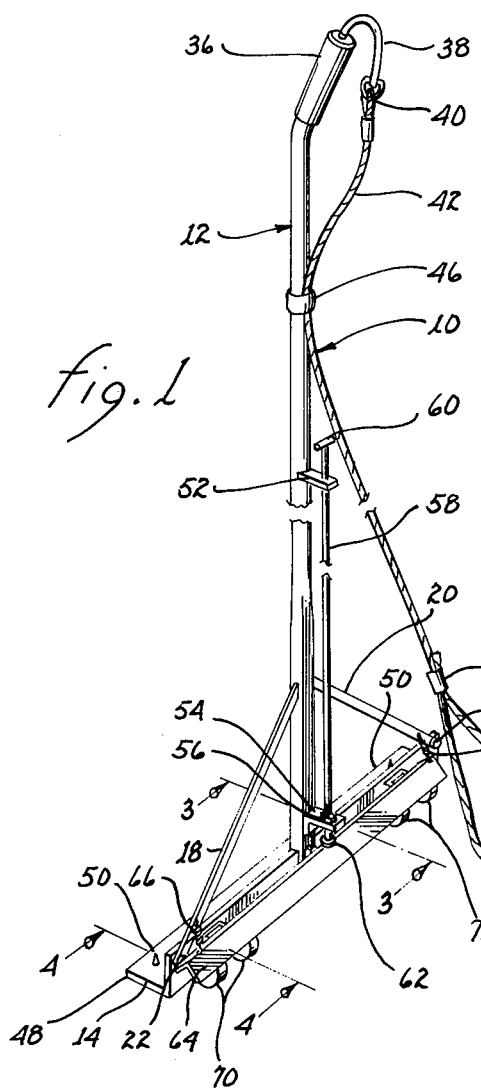
FIG. 1 is a perspective view of the device of this invention.

Referring to FIG. 1, the device generally designated by the numeral 10 includes an elongated, upright handle 12 to which is fixedly mounted a lifting flange 14. The main shaft 16 of handle 12 is attached at the midpoint of flange 14. Struts 18 and 20 extend from main shaft 16 to points 22 and 24, respectively, at opposing ends of flange 14.

Handle 12 has a terminal section 36 which makes a slight rearward bend from the main section. Extending from section 36 is a curved hook 38 to which is attached a swivel 40. Attached to swivel 40 is a cable 42 which terminates in stirrup 44. Cable 42 passes through guide collar 46 which may be slidably moveable along the main section of handle 12, if desired. Cable 42 passes through a collar 47 to commence the stirrup 44. Cable 42 is then passed back through collar 47 to complete the stirrup 44. Stirrup 44 may be changed in size by increasing or decreasing the length of cable 42 making up the stirrup 44. This will effectively increase or decrease the length of the cable, thereby correspondingly increasing or decreasing the distance from the floor to the proximate point of the stirrup 44, the purpose for which will be explained hereinafter.

The base 48 of flange 14 may optionally include pins 50 which serve to maintain a door in position when resting on base 48. Pins 50 are threadably mounted for removal if desired, as would be the case if the pins 50 were to be damaging to the base of the door or other object being carried on flange 14.

Figure 3:
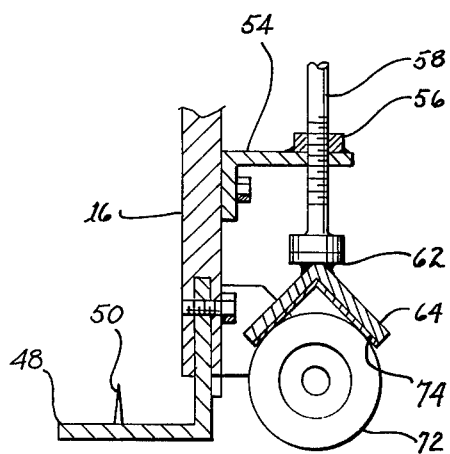
FIG. 3 is a sectional view taken along line 3—3 of FIG. 1.

Mounted on shaft 16 of handle 12 are bracket guides 52 and 54. The latter has a threaded aperture to threadably receive threaded section 56 of rod 58. Rod 58 has a knob 60 at one end and a head 62 at the other. Positioned directly below head 62 is angle member 64 which is mounted to struts 18 and 20 by springs 66 and 68 which bias angle member 64 upwards away from wheel pairs 70 and 72. As seen in FIG. 3, to the underside of angle member 64 is affixed a friction member 74. As will be described in detail hereinafter, angle member 64 serves as a releasable brake for wheels 70 and 72; the friction member 74 providing a yieldable surface to impart the braking force. Friction member 74 is preferably made of a wear resistant, resilient material such as a section of rubber inner tube or rubberized fabric.

The mounting of wheels 70 and 72 is best seen in FIGS. 4 and 5 to which reference is now made. Mounting of wheel pair 70 is illustrated and described; wheel pair 72 is similarly mounted. Connected to the rear of upright section 75 of flange 14 is wheel mounting bracket 76. Bracket includes spaced ears 78 which extend transversely from upright section 75 and spaced ears 80 which extend angularly downward. Mounted to axle 86 of wheel 70 is a bracket 88 which fits within ears 80. In the space between ears 92 of bracket 88 is a block 96. Extending through ears 80 and 92 and block 96 is mounting pin 98. Bolted to one side of angle member 64 is flange 100. Bonded to the underside of angle member 64 is friction member 74. Flange 100 includes lip 102 which is positioned between ears 78 of bracket 76.

The operation of the device 10 is illustrated in part in FIG. 3. A door 103 to be hung is positioned laterally in the doorway. Door 103 rests on the ledge provided by flange 14. The door 103 is transported to the doorway by using device 10 as a dolly. The base of door 103 rests on the base of flange 14 while the face 104 of door 103 leans toward device 10, resting on upright piece 75 of flange 14 and the fronts of handle 12 and struts 18 and 20.

Figure 2:
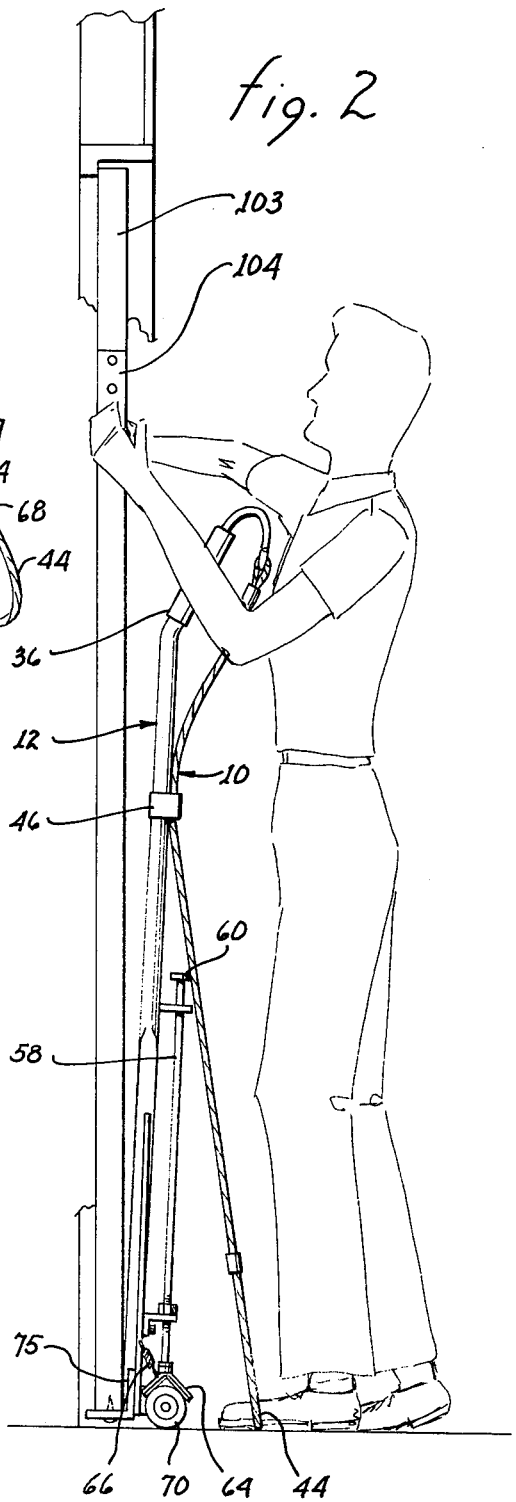
FIG. 2 is a side elevational view of the device with a door being positioned in lateral and vertical alignment for hanging.

Once door 103 is positioned laterally in the doorway, rod 58 is turned via knob 60 to move angle member 64 into a locking, braking relationship with wheels 70 and 72. The foot is then inserted in stirrup 44 (which is elevated a predetermined distance from the floor) and the foot within stirrup 44 pressed against the floor. This causes the device 10 to pivot about an axis through wheels 70 and 72 thereby raising the door 103 the short distance needed to vertically align the door 103 with the hinges upon which the door is to be mounted. While steadying the door if necessary with the left hand, the right hand drops the hinge pins through the aligned apertures in the hinge to complete the operation. The foot is then removed from stirrup 44 and the device pivots counterclockwise as viewed in FIG. 2 dropping flange 14 below the bottom of the door 103. Angle member 64 is then retracted and the wheels 70 and 72 are now free to rotate.

The distance from the floor to the base of the stirrup 44 determines the height to which the door can be raised by the device of this invention. This distance can be effectively adjusted in a variety of ways such as by changing the depth of the stirrup 44. This can be accomplished by increasing or decreasing the length of the cable forming the stirrup as above described. Another way in which the distance of the base of stirrup 44 from the ground can be varied is by sliding guide collar 46 up or down main shaft 16 as desired. In a particular embodiment the vertical height from the base of wheels 70 and 72 to the end of handle 12 is about 55 inches (138 cm.) and the length of cable 42 (including stirrup 44 is 52 inches (130 cm.).

The device of this invention combines both a dolly and jack function to provide an economical, simple means for transporting and hanging a door by one person. It is understood that many modifications may be made without departing from the spirit and scope of the invention.

What is claimed is:

1. A device for elevating and supporting an object comprising:
   a. an elongated, upright handle member;
   b. support means fixedly mounted to said handle member providing underlying support for the object to be lifted;
   c. floor engageable pivot means, said pivot means comprising roller means;
   d. cable means having a foot insertable stirrup section, said cable means having a length such that upon insertion of the foot in said stirrup section and pressing of the foot on the floor, said pivot means are pivoted whereby said object supported by said support means is moved to an elevated position; and
   e. releasable locking means for releasably locking said pivot means.

2. The device of claim 1 wherein said releasable locking means comprise a brake member positioned in operative relationship to said roller means, biasing means normally urging said brake member away from said roller means, and actuating means for releasably actuating said brake member into braking relationship with said roller means.

3. The device of claim 1 wherein said actuating means comprise a threaded member and bracket means having a threaded aperture for threadably receiving said threaded member whereby turning of said threaded member in one direction causes said threaded member to engage said brake member to move the same into braking relationship against said roller means and turning of said elongated member in another direction releases said threaded member from engagement with said brake member whereby said biasing means urges said brake member into a non-braking relationship with said roller means.

4. The device of claim 1 wherein said support means comprises a flange member having a base plate disposed in a horizontal plane and an upright plate disposed at a right angle to said base plate, said support means being adapted to support said object in a vertical position prior to elevating said object.

* * * * *